Aug. 11, 1964         J. J. DONOVAN         3,144,030
AUTOMATIC FILM DEVELOPING APPARATUS
Filed Aug. 30, 1963                3 Sheets-Sheet 1

Joseph J. Donovan
INVENTOR.

BY *Clarence A. O'Brien*
*and Harvey B. Jacobson*
Attorneys

Aug. 11, 1964  J. J. DONOVAN  3,144,030
AUTOMATIC FILM DEVELOPING APPARATUS
Filed Aug. 30, 1963  3 Sheets-Sheet 2
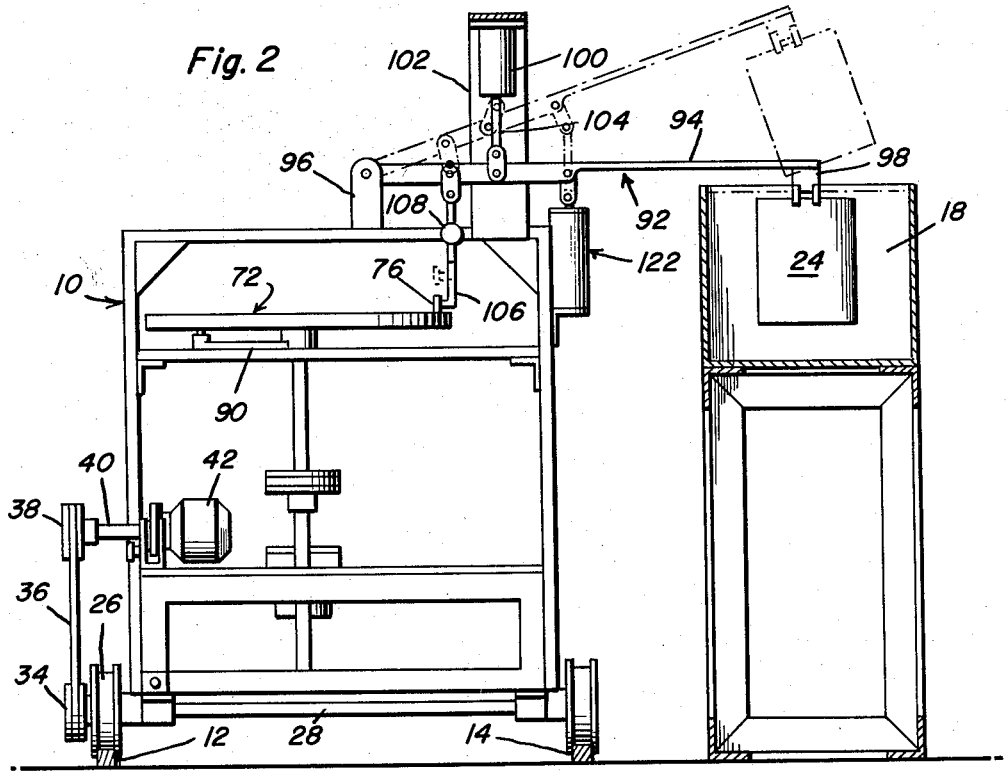
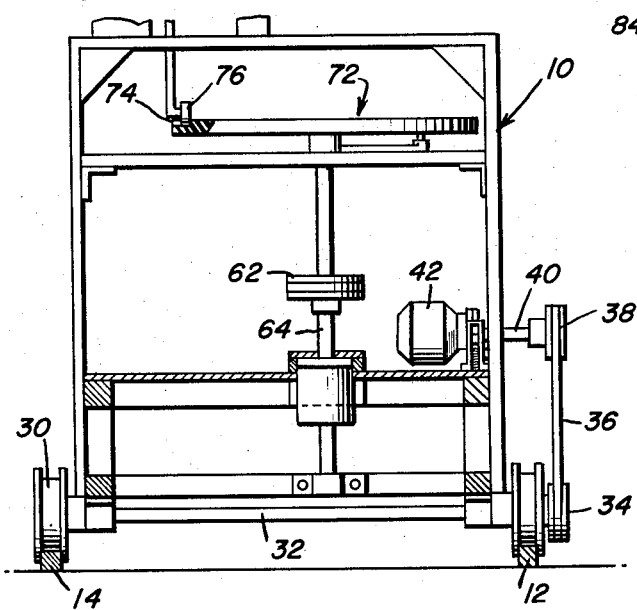
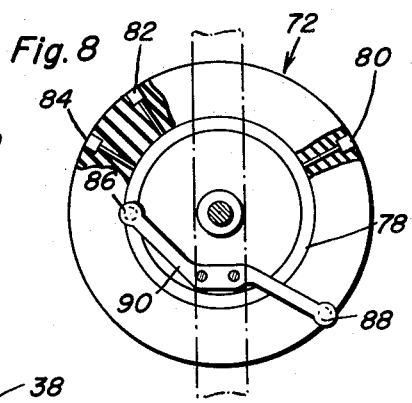
Joseph J. Donovan
INVENTOR.

Aug. 11, 1964　　　J. J. DONOVAN　　　3,144,030
AUTOMATIC FILM DEVELOPING APPARATUS
Filed Aug. 30, 1963　　　　　　　　　　3 Sheets-Sheet 3
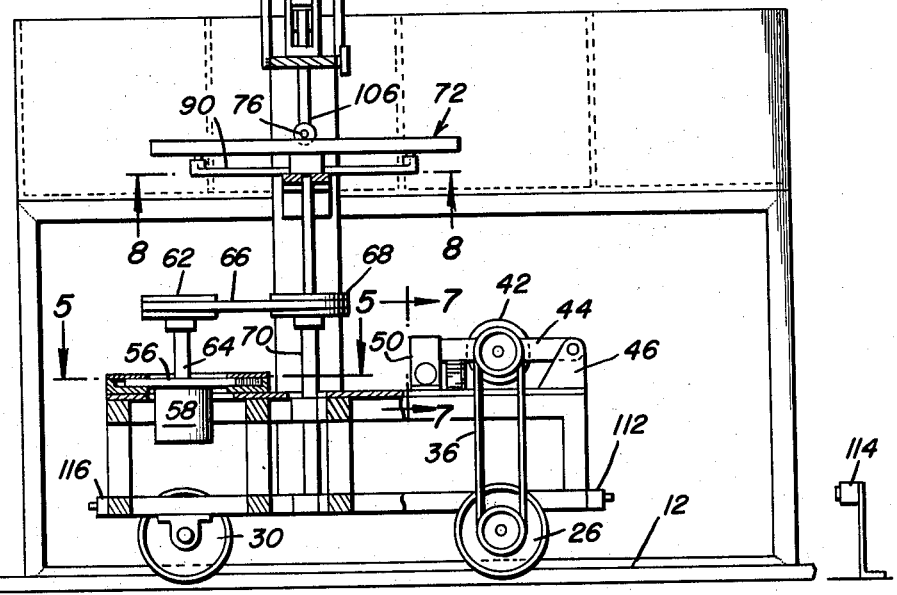
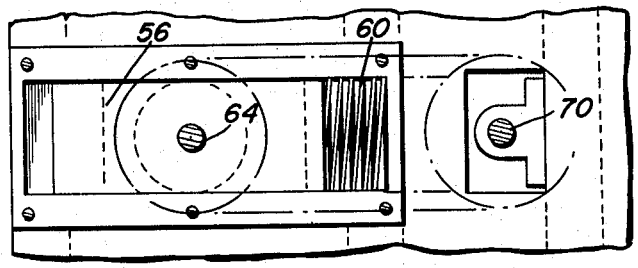
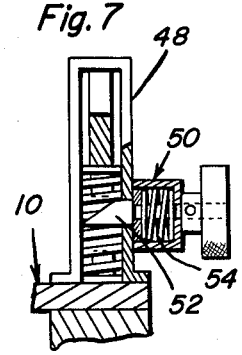
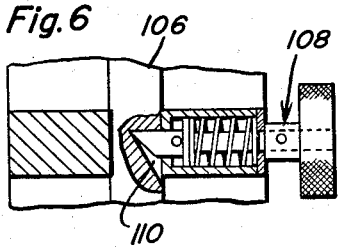
Joseph J. Donovan
*INVENTOR.*

United States Patent Office 3,144,030
Patented Aug. 11, 1964

3,144,030
AUTOMATIC FILM DEVELOPING APPARATUS
Joseph J. Donovan, 1690 Wilson, San Luis Obispo, Calif.
Filed Aug. 30, 1963, Ser. No. 305,444
14 Claims. (Cl. 134—58)

This invention relates to apparatus for handling and positioning articles such as film at a plurality of process stations and more particularly to the movement and positioning of film within process baths for developing purposes or the like.

The present invention is concerned with automatically programmed means whereby X-ray or photographic films may be sequentially moved and immersed into the various process baths asociated with the developing of such film. In particular, the apparatus of the present invention is concerned with the provision of relatively simple yet effective apparatus capable of achieving the aforementioned objective and also capable of being adjusted in accordance with varying requirements. It is therefore a primary object of the present invention to provide a film handling and positioning mechanism featuring a programming turntable by means of which programmed movement may be imparted to the film and through which the film may be agitated while immersed in the various process baths.

Another object of the present invention is to provide an article handling and positioning mechanism mounted on a carriage the movement of which is programmed through a complete cycle with facilities for automatically resetting the mechanism when returned to its initial starting position.

A still further object of the present invention is to provide a film handling and positioning apparatus having a movable dip arm adapted to lower and raise an article such as film in conjunction with movement of the article between various stations and wherein the dip arm is agitated only when in its lowered position by means of a programming turntable which is also operative to control the programmed movement of the carriage on which the dip arm is mounted.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a front sectional view taken substantially through a plane indicated by section line 2—2 in FIGURE 1.

FIGURE 3 is a rear sectional view taken substantially through a plane indicated by section line 3—3 in FIGURE 1.

FIGURE 4 is a side elevational view with parts broken away and shown in section of the apparatus illustrated in FIGURE 1.

FIGURE 5 is a partial sectional view taken substantially through a plane indicated by section line 5—5 in FIGURE 4.

FIGURE 6 is an enlarged partial sectional view taken substantially through a plane indicated by section line 6—6 in FIGURE 1.

FIGURE 7 is an enlarged partial sectional view with parts broken away and shown in section taken substantially through a plane indicated by section line 7—7 in FIGURE 4.

FIGURE 8 is a partial sectional view taken substantially through a plane indicated by section line 8—8 in FIGURE 4.

Figure 1:
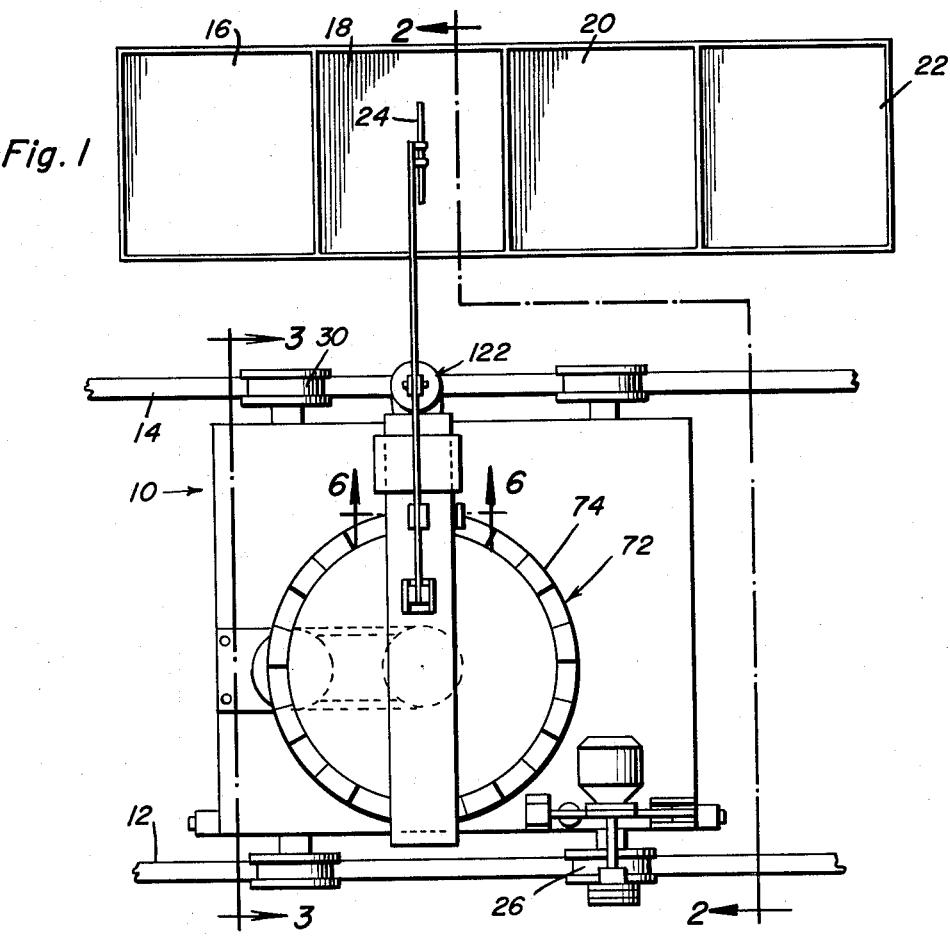
FIGURE 1 is a top plan view of one typical form of apparatus constructed in accordance with the principles of the present invention.

Referring now to the drawings in detail, it will be observed that the apparatus as illustrated in FIGURES 1 and 2, includes a carriage generally referred to by reference numeral 10 adapted to be propelled along a pair of spaced tracks 12 and 14 in a direction parallel to a plurality of process bath chambers including for example a developer bath chamber 16, a rinse bath chamber 18, a fixer bath chamber 20 and a final washing chamber 22. It will of course be appreciated that the apparatus may be associated with other proces baths and/or stations at which other process steps are performed on an article such as the film 24 being moved by the carriage 10. It will also be appreciated, that the specific construction of the carriage may vary considerably in accordance with installational requirements and engineering design.

In order to propel the carriage along the tracks 12 and 14, the carriage rotatably mounts a pair of driving wheels 26 riding on the tracks and interconnected by a drive spindle 28. A second pair of carriage supporting wheels 30 are provided for the carriage interconnected by spindle 32 as more clearly seen in FIGURE 3. Connected to one of the driving wheels 26, is a driven pulley 34 which is drivingly connected by the endless drive belt 36 to a drive pulley 38. The drive pulley is connected to the end of a motor shaft 40 extending from a carriage propelling motor 42. As more clearly seen in FIGURES 4 and 7, the drive propelling motor 42 is carried on a belt tightening motor mount arm 44 one end of which is pivotally mounted on the carriage by the pivot bracket 46 and is biased to a belt tightening position. The other end of the arm 44 extends through a bracket 48 associated with a drive disengaging latch device 50. It will therefore be appreciated, that the belt drive is maintained under driving tension by the upward bias imposed on the arm 44 which may be held in a slack condition in order to disengage the drive by latching the arm 44 under the latch plunger 52 after it is withdrawn against the bias of the spring 54. In this manner, the propelling drive for the carriage will be disengaged upon overload or held disengaged when desired.

Also mounted on the carriage by means of a yieldably displaceable motor mount 56, is a programming control motor 58. The motor mount 56 may therefore be biased by the spring 60 to a position exerting a belt tightening force on the drive pulley 62 connected to the upper end of the motor shaft 64 in order to establish driving engagement by means of the endless drive belt 66, with a driven pulley wheel 68 fixed to a drive shaft 70 rotatably mounted by the carriage in parallel spaced relation to the motor shaft 64. Connected to the upper end of the shaft 70 spaced above the drive pulley 68, is a programming disc member or turntable 72. The turntable is provided on the top surface thereof with a peripheral, surface displacing portion 74 as more clearly seen in FIGURES 1 and 3. The portion 74 may be in the form of either corrugations or ratchet teeth arranged to impart vibratory movement to a follower element 76 in response to rotation of the programming disc member. Also provided on the underside of the disc member 72 as more clearly seen in FIGURE 8, is an inner radial commutator ring 78 made of electrically conductive material. The disc member 72 itself is made of an electrically non-conductive material. Also disposed in circumfentially spaced relation to each other adjacent the outer periphery of the disc member, are a plurality of contact elements 80, 82 and 84. The contact elements are electrically connected to the conductive ring 78 so that an electrical connection is made between the brush element 86 in continuous contact with the ring 78 and the brush element 88 when engaging one of the contact elements. Accordingly, the brush elements are mounted in fixed spaced relation to each other by means of a non-conductive bracket 90, with the brush element 86 in continuous contact with the ring 78 and the brush element 80 disposed in the path of movement of the contact elements 80, 82 and 84. In this manner, programmed movement and stoppage of the carriage by energization and deenergization of the carriage propelling motor 42 is effected in response to continuous drive of the programming disc member by the programming motor 58.

As more clearly seen in FIGURE 2, an article carrying mechanism 92 is mounted on the carriage 10 so that it may be operated in conjunction with programmed movement and stoppage of the carriage. The mechanism 92 therefore includes a dip arm or lever 94 one end of which is pivotally mounted by the bracket 96 on the carriage with the other end projecting therefrom and having secured thereto, an article holder 98 by means of which any appropriate article is held such as the film 24. The article 24 may therefore be raised from its lowered position illustrated by solid line in FIGURE 2 to the elevated position shown by dotted lines in FIGURE 2 in order to retract the film from a process bath. Toward this end, a retraction solenoid 100 is fixedly mounted by the bracket 102 in spaced relation above the dip arm 94 and is provided with an armature 104 pivotally connected to the dip arm intermediate the ends thereof. The retraction solenoid 100 is therefore energized simultaneously with the energization of the carriage propelling motor 42 so that when the carriage is moved, the film 24 will be retracted from the process bath in which it was immersed. The carriage propelling motor will therefore be deenergized when the carriage reaches its next station and the retraction solenoid will be simultaneously deenergized so that the dip arm may lower the film 24 into the process bath at the station at which the carriage has stopped. When the dip arm 94 is in its lowered position it will also lower an agitator element 106 into engagement with the peripheral portion 74 of the programming disc member 72 so that rotation of the disc member will impart vibration to the dip arm in order to agitate the liquid solution or bath in which the film 24 is immersed. The follower element 76 aforementioned, is therefore connected to the lower end of the agitator element 106 so as to impart vibratory movement to the agitator element. The agitator element is movably mounted by the carriage for vertical vibratory movement and is pivotally connected to the dip arm in adjacent spaced relation to the pivotal connection thereto of the retraction solenoid armature 104. In order to selectively hold the dip arm in its retracted position and the agitator element withdrawn from engagement with the programming disc member 72, a latch device 108 is mounted by the carriage and biased into engagement so that it may be displaced into engagement with a notch 110 formed in the agitator element 106 as more clearly seen in FIGURE 6. In this manner, the agitator element may be held withdrawn as indicated when desired.

Also mounted on the carriage is a limit switch 112 of the push-pull type adapted to be engaged by an abutment element 114 when the carriage arrives at a predetermined location which may be either at a station wherein the film 24 is aligned with the washing chamber or when aligned with some drying chamber after passing the washing chamber. Engagement of the limit switch 112 with the abutment 114 is therefore operative to render the drive propelling motor 42 inoperative in order to stop further movement of the carriage 10. The abutment device 114 may also include a magnetic element so that when the carriage 10 is withdrawn from the predetermined location, back to its original start position, the switch device will be pulled so as to reset the drive propelling motor to its operative condition. The apparatus may therefore also be provided with a main power switch 116 as shown in FIGURE 4 so that when the carriage movement has stopped at the end of a completed cycle, both the drive propelling motor 42 and the programming motor 58 may be simultaneously disabled in order to permit withdrawal of the carriage to its start position. It will therefore be apparent, that when the main power switch 116 is closed, starting an operating cycle, the programming motor 58 will remain continuously energized in order to program operations, while the carriage propelling motor 42 will be intermittently energized and deenergized in accordance with the predetermined program and will then remain deenergized at the end of a cycle by actuation of the limit switch 112.

Figure 9:
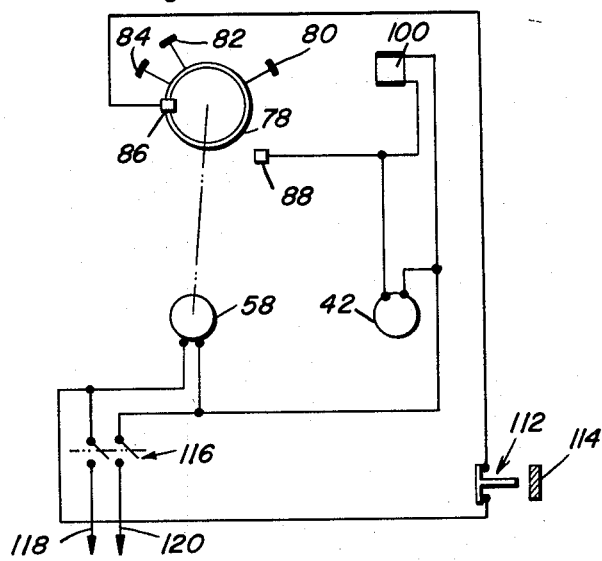
FIGURE 9 is an electrical circuit diagram associated with the apparatus of the present invention.

Referring now to FIGURE 9, the electrical controls for achieving the aforementioned operations will be described and said operations summarized. It will be observed from FIGURE 9, that upon closing of the power switch 116, an energizing circuit will be completed between an external source to which the power lines 118 and 120 are connected and the programming motor 58 so that it may be continuously energized thereafter during the program cycle. The limit switch 112 will also be normally closed so that parallel energizing circuits are simultaneously completed through the retraction solenoid 100 and carriage propelling motor 42 when the brush element 88 is in engagement with one of the contacts 80, 82 and 84. Accordingly, rotation of the programming disc member 72 will successively bring the contact elements into engagement with the brush element 88 in order to energize and deenergize the solenoid 100 and the motor 42. Programmed energization and deenergization will therefore depend upon the angular spacing between the contact elements, the duration of contact between the contact elements and the brush element 88 and the movement speed of the carriage. The angular spacing and width of the contact elements may therefore be varied in accordance with any desired program. Also, the drive ratio between the programming motor 58 and programming disc member will be selected in accordance with timing requirements. Similarly, the drive ratio between the carriage propelling motor 42 and the drive wheels 26 of the carriage will be selected in accordance with the desired rate of movement of the carriage. A fluid dashpot device 122 is also mounted on the frame and connected to the dip arm 94 as more clearly seen in FIGURE 2, so as to retard movement thereof upon the energization of the solenoid 100 in order to avoid abrupt retraction of the film 24. It will also be apparent, that the cycle will be completed when the limit switch 112 is opened by engagement with the abutment 114. When this occurs, it will be observed that the solenoid 100 and the motor 42 will be held deenergized so as to prevent any further movement of the carriage and to also hold the article or film 24 in its operative or lowered position. The power to the control circuit is disconnected by opening of the power switch 116 either selectively or automatically upon opening of switch 112 after which the carriage is returned to its starting position. It will however be noted that when the carriage is withdrawn from its position at the end of the cycle, the magnetic abutment 114 will pull the limit switch 112 to its closed position so that the circuit will be reset for operation when the power switch 116 is selectively closed thereafter to start a new cycle.

From the foregoing description, the operation, construction and utility of the apparatus of the present invention will be apparent. The various advantageous attributes of the apparatus as hereinbefore indicated, will therefore be realized by the described construction. The apparatus while capable of being utilized for a variety of different article handling and positioning purposes, is particularly useful in automating film developing procedures. Accordingly, as one practical application of the apparatus described, the programming disc member may be made to rotate one revolution in sixteen and a half minutes by proper selection of the drive ratio between the pulleys 62 and 68 and the speed of the programming motor 58. Thus, with contact engagement between the brushes and the contact elements set for a duration of ten seconds, the film may be held immersed in the developer chamber 16 for five minutes, in the rinse bath chamber 18 for forty-five seconds, in the fixer bath chamber 20 for ten minutes and in the final wash chamber 22 for five minutes. Also, movement of the carriage between the various stations may be effected at the proper speed as for example one inch per second by proper selection of the speed of the carriage propelling motor 42 and the drive ratio between the pulleys 34 and 38. It will also be apparent, that each time the propelling motor is energized to move the carriage, the retraction solenoid is simultaneously energized to hold the film elevated. During this energization period, the duration of which is controlled by the width of the contact elements, the carriage may be moved to the next station at the requisite speed. Only when the carriage is at its proper station, will the propelling motor and retraction solenoid be deenergized at which time the continued rotation of the programming disc will be effective to agitate the film by vibration of the article carrying dip arm.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for handling articles sequentially positioned at a plurality of stations comprising, a carriage, propelling drive means mounted on the carriage for propulsion thereof past said plurality of stations, continuously driven programming means operatively mounted on said carriage for controlling energization and deenergization of said drive means to propel and stop said carriage at each of said stations, article carrying means movably mounted on said carriage for displacement of an article to a retracted position, retraction means operatively connected to said article carrying means for retraction thereof simultaneously with the energization of the propelling drive means, and agitator means operatively mounted on the article carrying means for engagement with the programming means upon deenergization of the drive means to vibrate the article carrying means in response to movement of the programming means.

2. The combination of claim 1, including limit stop means mounted on the carriage for rendering the drive means inoperative in response to arrival of the carriage at a predetermined location, abutment means engageable with said limit stop means at said location of the carriage for resetting the drive means to an operative condition in response to withdrawal of the carriage from said location, and selectively controlled means for simultaneously disabling operation of the drive means and the programming means.

3. The combination of claim 2, wherein said programming means comprises, rotatable disk means having programming contacts thereon for establishing energizing circuits for the drive means and the retraction means and surface displacing means mounted on said disk means for engagement by the agitator means.

4. The combination of claim 3, including selectively operable latch means mounted on the carriage for holding the agitator means withdrawn from engagement with the programming means.

5. The combination of claim 4, wherein said article carrying means comprises, a dip arm pivotally mounted at one end on the carriage and having an opposite end projecting therefrom and a holder fixed to said opposite end of the dip arm, said retraction means and said agitator means being connected to the dip arm intermediate the ends thereof.

6. The combination of claim 1, wherein said programming means comprises, rotatable disk means having programming contacts thereon for establishing energizing circuits for the drive means and the retraction means and surface displacing means mounted on said disk means for engagement by the agitator means.

7. The combination of claim 6, including selectively operable latch means mounted on the carriage for holding the agitator means withdrawn from engagement with the programming means.

8. The combination of claim 1, wherein said article carrying means comprises, a dip arm pivotally mounted at one end on the carriage and having an opposite end projecting therefrom and a holder fixed to said opposite end of the dip arm, said retraction means and said agitator means being connected to the dip arm intermediate the ends thereof.

9. The combination of claim 8, including selectively operable latch means mounted on the carriage for holding the agitator means withdrawn from engagement with the programming means.

10. The combination of claim 1, including selectively operable latch means mounted on the carriage for holding the agitator means withdrawn from engagement with the programming means.

11. The combination of claim 10, including limit stop means mounted on the carriage for rendering the drive means inoperative in response to arrival of the carriage at a predetermined location, abutment means engageable with said limit stop means at said location of the carriage for resetting the drive means to an operative condition in response to withdrawal of the carriage from said location, and selectively controlled means for simultaneously disabling operation of the drive means and the programming means.

12. Apparatus for handling articles sequentially positioned at a plurality of stations comprising, a carriage, propelling drive means for propulsion of said carriage past said plurality of stations, programming means operatively connected to said drive means for controlling energization and deenergization thereof to propel and stop said carriage at each of said stations, article carrying means movably mounted on said carriage for displacement of an article to a retracted position, retraction means operatively connected to said article carrying means for retraction thereof simultaneously with the energization of the propelling drive means, agitator means operatively mounted on the article carrying means for engagement with the programming means upon deenergization of the drive means to vibrate the article carrying means in response to movement of the programming means, limit stop means mounted on the carriage for rendering the drive means inoperative in response to arrival of the carriage at a predetermined location, and abutment means engageable with said limit stop means at said location.

13. The combination of claim 12, wherein said programming means comprises, rotatable disk means having programming contacts thereon for establishing energizing circuits for the drive means and the retraction means and surface displacing means mounted on said disk means for engagement by the agitator means.

14. The combination of claim 13, including selectively operable latch means mounted on the carriage for holding the agitator means withdrawn from engagement with the programming means.

References Cited in the file of this patent

UNITED STATES PATENTS

| | | |
|---|---|---|
| 2,177,982 | Hannon | Oct. 31, 1939 |
| 2,527,959 | Quinn | Oct. 31, 1950 |